Aug. 26, 1969 J. J. HALSTEAD 3,463,873

COMMUNICATION CODING SYSTEM

Filed Nov. 30, 1966 2 Sheets-Sheet 1

INVENTOR.
JESSE J. HALSTEAD,
By L E Carnahen
AGENT.

COMMUNICATION CODING SYSTEM

Filed Nov. 30, 1966 2 Sheets-Sheet 2

INVENTOR.
JESSE J. HALSTEAD,
By L E Carnahan
AGENT.

3,463,873
COMMUNICATION CODING SYSTEM
Jesse J. Halstead, La Verne, Calif., assignor to General Dynamics Corporation, a corporation of Delaware
Filed Nov. 30, 1966, Ser. No. 598,066
Int. Cl. H04n 1/44
U.S. Cl. 178—5.1 9 Claims The invention relates to secure communication systems, particularly to a communication system which cannot be intercepted and decoded by unauthorized personnel, and more particularly to a high security telegraph coding system.

There has long existed a need for a secure communication system which insures a considerable amount of secrecy and which is adaptable for use with existing communication channels. Such systems are especially desirable for radio communication which is easily intercepted by unauthorized personnel. For example, one form of prior art secrecy communication system comprises an arrangement for alternately transmitting desired signal and noise signals, the alternate transmission occurring in an irregular manner in accordance with a time sequence plan.

With the advent of computers, prior art systems of the above type have been easily decoded by quick determination of the noise pattern. Thus there exists today a greater need for a means of communication which cannot be intercepted and decoded by unauthorized persons.

A secure communication system has been provided by this invention through the use of optical correlating disks in both the modulation and demodulation equipment. These coding disks have a pattern of nominal sized holes that are arranged in a totally random pattern. The more random the hole pattern, the better the system will operate in a noisy signal environment. If a light beam, one hole diameter wide, was interrupted by one of these disks rotating in the beam, a pattern of light pulses would be created. This pattern of pulses has the following unique characteristics: (1) a noise-like time and frequency characteristic; (2) created only at the exact radial distance, on this disk, and at a specific rotational frequency; and (3) real-time correlated with the spin of the disk. Therefore, two signals of the same noise "signature" may be created with two of the light beams at the same radius on the disk, but they will not correlate because they are different in time. A similarly arranged disk and optical arrangement functions as the receiver.

Therefore, it is an object of this invention to provide a secure communication system.

A further object of the invention is to provide a high security telegraph coding system.

Another object of the invention is to provide a means of communication which cannot be intercepted and decoded by unauthorized persons.

Another object of the invention is to provide a secure communication system which utilizes optical correlating disks in both the modulation and demodulation equipment.

Other objects of the invention, not specifically set forth above, will become readily apparent from the following description and accompanying drawings wherein.

Broadly, the present invention is directed to a secure communication system using synchronously operated optical correlating code disks in both transmitting and receiving equipment. These code disks have a random pattern of nominal sized holes. The system comprises a transmitting station including an encoder disk which is rotated, a network of selectively energized lights arranged to represent letter or symbol and index locations and situated to shine through the holes in said disk, and light sensing means preceded by appropriate optics for developing a signal due to light shining through said holes and impinging thereon which is used to modulate a carrier signal to be transmitted over any appropriate media. A receiving station which includes a light source, selectively energized in response to received signals, which is situated to shine its light through a decoder disk which is identical to and rotated in synchronism with said encoder disk, and readout means situated to detect light passing through the holes in said decoder disk for thereby determining the sequence of letters or symbols which were transmitted. The readout means may be either a network of light sensing members or a transparency bearing the letter and index locations arranged in a pattern corresponding to that of the network of lights at the transmitting station.

Figure 1:
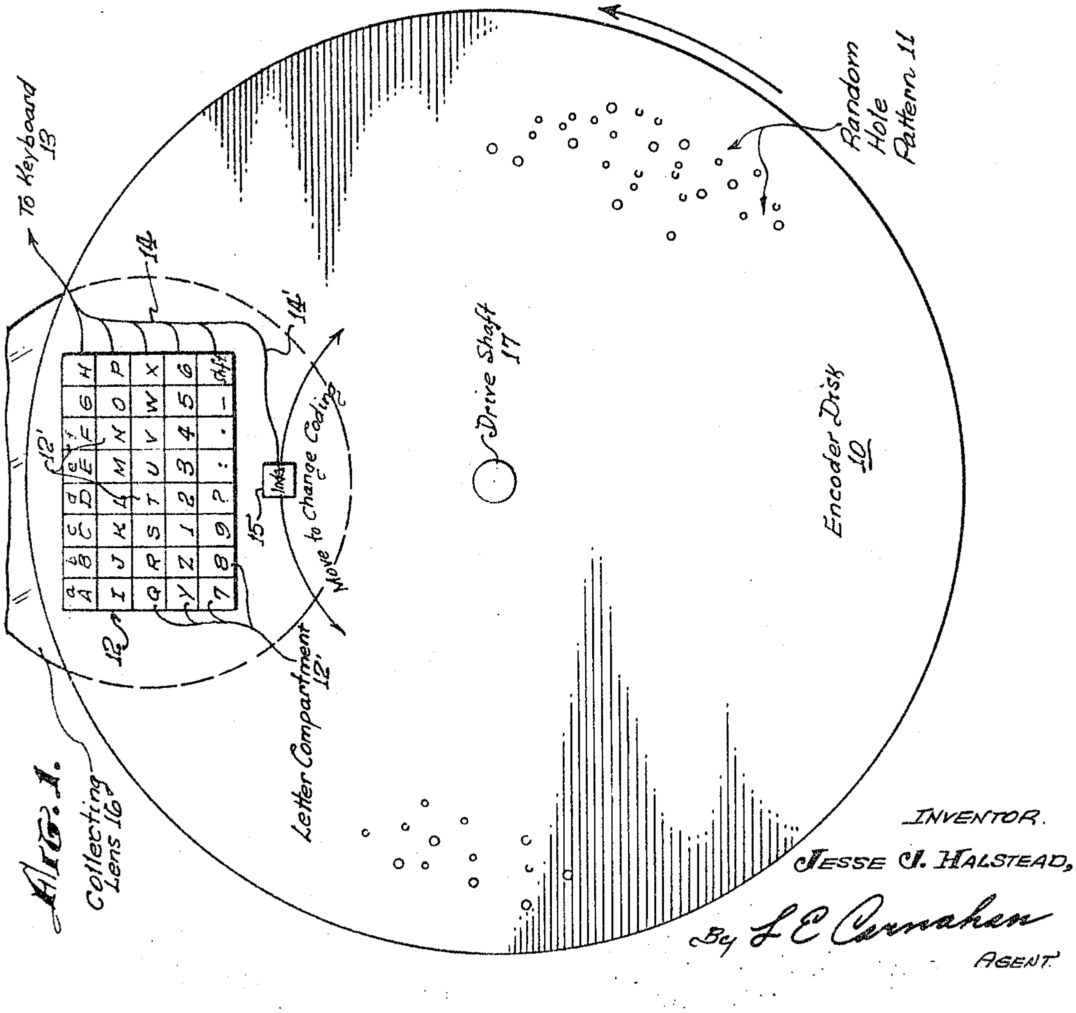
FIG. 1 is a plan view of the coding or modulation equipment of the inventive system.

FIG. 1 shows an encoder disk 10 having a random hole pattern indicated at 11 which covers the entire disk, only a portion of the hole pattern being shown for clarity; a frame 12 having therein letter or symbol compartments 12' which correspond to and electrically connect with a keyboard of a teletypewriter indicated by legend 13 via electrical wiring 14; an index unit 15 connected to keyboard 13 by wiring 14'; a collecting lens 16 partially positioned behind disk 10; and a drive shaft 17 for disk 10 which is driven by suitable means (not shown). The letter or symbol in compartments 12' only signify the location of a light from lamps 18 within the compartments which corresponds to that letter or symbol as described hereinafter with respect to FIG. 2. When a letter key is depressed on the teletypewriter 13, the lamp 18 in the corresponding letter in compartment 12' is lit. This light from lamp 18 shines through a hole 19 (see FIG. 2) in the bottom of that compartment 12'. Assuming a hole 11 in the disk 10 is at that location at that time, the light will then shine through the disk to the collecting lens 16. The collecting lens 16 focuses the light from any of the letter compartments 12' onto a sensing cell 20 which functions to produce electrical signals therefrom. As the disk 10 rotates, the light beams from the letter compartments will be modulated and will fall as pulses of light indicated at 21 on the sensing cell 20. Index unit 15 is provided with a lamp 18' therein and an aperture 19' in the bottom thereof which functions similarly to the letter or symbol compartments 12' as seen in FIG. 2.

Figure 2:
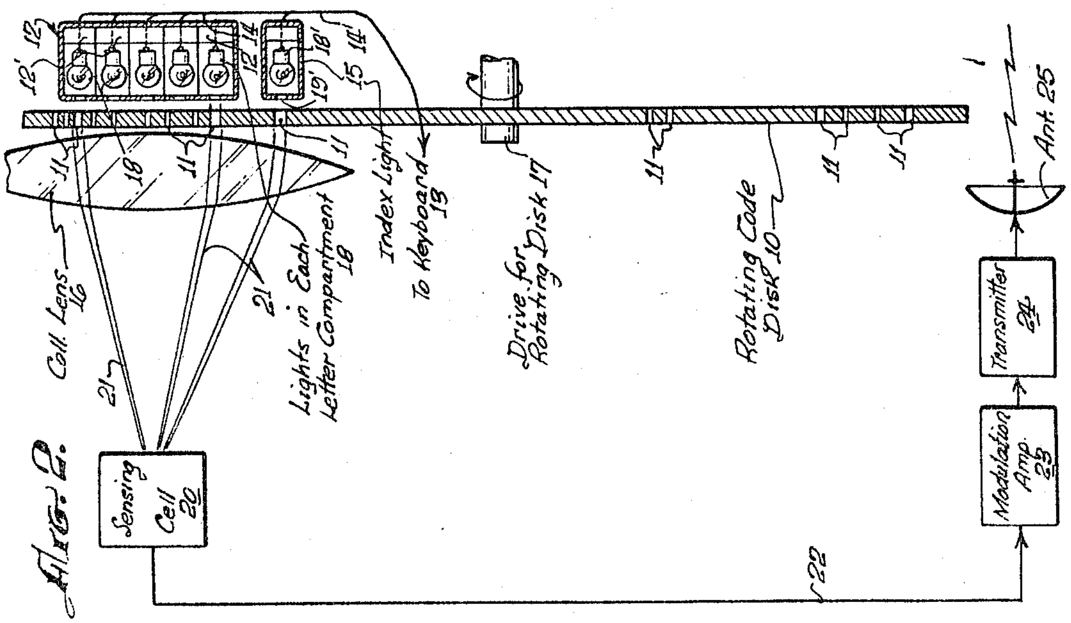
FIG. 2 is a view of the FIG. 1 equipment partially in cross section and partially in schematic illustrating the transmitting equipment of the system.

As seen in FIG. 2, the electrical signal indicated at 22 from the sensing cell 20 is directed through a modulation amplifier 23, a transmitter 24 and out via an antenna 25 in conventional manner. The transmitting media can be RF, as shown, or infrared, laser visible light, land line, etc.

To counter enemy deciphering techniques, code changes are relatively easy. For example, the disks may be changed at intervals, the letters may be rescrambled, and the frame containing the letter compartments may be rotated or moved by prescribed amount or at prescribed synchronous rates. Changing of the index location will also change the code.

The purpose of the index point 15 is to phase the receiving disk to the transmitting disk 10 as described hereinafter in greater detail with respect to FIGS. 3 and 4. This phase lock must be maintained to provide the real-time reference described above.

Figures 3, 4:
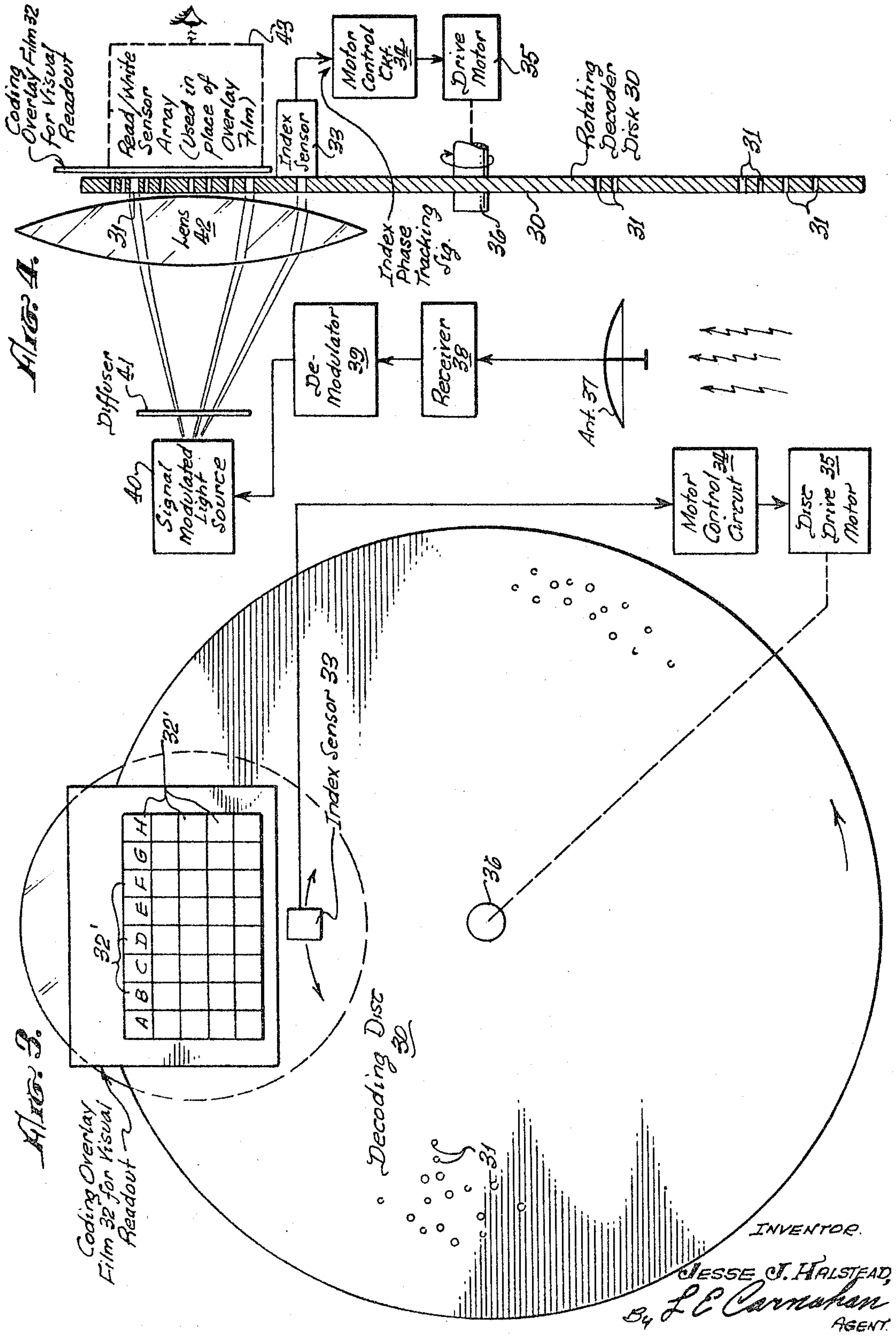
FIG. 3 is a partial plan view of the receiving equipment of the inventive system.
FIG. 4 is a view of the FIG. 3 equipment partially in cross section and partially in schematic illustrating the demodulation, readout and disk synchronization equipment of the system.

The receiver decoding equipment is shown in FIGS. 3 and 4. The receiver equipment comprises a decoding disk 30 of the same configuration as encoder disk 10 and having holes 31 therethrough which correspond with the holes 11 in disk 10; a coding overlay film 32 having letter or symbol sections 32' which correspond with the letter or symbol compartments 12' of the transmitting equipment; and an index sensor 33 which functions to synchronize the rotation of the disks 10 and 30 via a motor control circuit 34, drive motor 35 and drive shaft 36 for disk 30.

The incoming signal to the receiver equipment, as shown in FIG. 4, is received by an antenna 37 and directed through a receiver 38, a demodulator 39 to a signal modulated light source 40. Light pulses from source 40 are directed through a diffuser 41 to a lens 42 which illuminates the entire lens area behind the disk 30 with uniform light each time the modulated source 40 is pulsed on. The light passes with greater intensity through certain holes 31 of disk 30 and upon the desired letters 32' of overlay film 32 than upon other letters 32' due to these certain holes being in the desired location due to the indexing arrangement.

If a visual presentation is desired, the film transparency 32 of the proper letter and index locations may be placed over the proper frame location. This frame location, relative to the index mark, is pre-determined and must be the same relative location as on the transmitting equipment. As the letters are transmitted a bright spot will appear behind the proper letter. If a print-out system is desired, as indicated at 43, a photo-sensing cell (not shown) is placed at each of the letter locations to activate the key punching system of a teletypewriter. The photo-sensing cell is activated by the bright spot appearing behind the proper letter.

The appearance of the bright spot at the proper location is accomplished as described below:

In the transmitting equipment, the light beams are modulated into noise-like trains of pulses. These "signature" trains are characteristic of only one location on the chopping pattern. This "signature" train is made to modulate a light source 40 which illuminates disk 30 which is identical to and synchronously rotated with the disk 10. Only one point on the disk 30 will be integrated to a higher RMS value of light and appear to be synchronous. This is because the holes 31 appearing at that location, at that time, and with that freqency (i.e., synchronously with disk 10) are matched to the disk 10. Thus, the appearance of the holes 31 at that location correlates with the signal being transmitted.

The relative light level of the whole field of holes 31 will appear to be about 50 percent, while the light level of the synchronous hole will be about 100 percent.

The "signature" signal of index 15 is transmitted continuously to provide a disk synchronization point. This signal, along with the letter or symbol signal, is mixed together and in turn modulates the carrier media simultaneously. It is possible also to send more than one letter or symbol at a time if it is desirable to further compound the coding.

Using the above described correlation detection method about a 5:1 noise-to signal ratio is possible, thus providing good detection probabilities. It is feasible to mix noise purposely in with a transmitted signal to further confuse the noise-signal patterns.

When signal conditions are degraded by high noise contents, the output light levels may be integrated over longer periods of time by transmitting each letter for greater time lengths, thereby improving detection probability. Either electrically or optically integrating the light levels of the output field for longer periods of time reduces the effects of high noise environments.

It is thus seen that the present invention provides a secure communication system which cannot be intercepted and decoded by unauthorized persons. This system is accomplished with reasonable simplicity by the use of optical correlating disks having a random hole pattern in both the modulation and demodulation equipment.

Although a particular embodiment of the invention has been illustrated and described, changes and modifications will become apparent to those skilled in the art, and it is intended to cover in the appended claims all such changes and modifications as come within the true spirit and scope of the invention.

What I claim is:,

1. A secure communication system comprising: a transmitting station including an encoder disk, means for rotating said disk, said disk being provided with a random pattern of apertures therethrough, a network of selectively energized lights arranged to represent symbol and index locations and adapted to shine through said apertures in said disk, means for selectively energizing said lights, optical means positioned to receive light beams from said lights and for transmitting such beams to a light sensing means, and means adapted for modulating and transmitting signals produced by said light sensing means; a receiving station including a decoder disk having apertures therein corresponding to the random pattern of said encoder disk, means for synchronously rotating said decoder disk with said encoder disk, means adapted for receiving signals from said transmitting station and directing same to a signal modulated light source, said light source being adapted for directing light pulses through at least an optical means to a readout means and an element of said synchronously rotating means positioned on the opposite side of said decoder disk when certain of said apertures of said decoder disk are aligned therewith.

2. The communication system defined in claim 1, wherein said network of energized lights includes a plurality of compartments, each of said compartments being provided with a lamp means and a symbol corresponding to a key of an associated teletypewriter, each of said lamp means being electrically connected to said means for selectively energizing said lights, said compartments being provided with an aperture adjacent said encoder disk through which light from said lamp means shines.

3. The communication system defined in claim 1, wherein said means for selectively energizing said lights comprises a keyboard of an associated teletypewriter.

4. The communication system defined in claim 1, wherein said means adapted for modulating and transmitting signals produced by said light sensing means includes a modulation amplifier, a transmitter, and an antenna.

5. The communication system defined in claim 1, wherein said means in said receiving station for synchronously rotating said decoder disk with said encoder disk comprising an index sensor adapted to receive index signals from said transmitting station, motor control circuitry adapted to receive index phase tracking signals from said index sensor and motor means controlled by said control circuitry drivingly connected to said decoder disk.

6. The communication system defined in claim 1, wherein said means adapted for receiving signals from said transmitting station and directing same to a signal modulated light source including an antenna, a receiver, and a demodulator.

7. The communication system defined in claim 1, additionally including a diffuser means positioned intermediate said signal modulated light source and said optical means of said receiving station.

8. The communication system defined in claim 1, wherein said optical means of said transmitting station comprises a collecting lens.

9. The communication system defined in claim 1, wherein said readout means comprises a coding overlay film having symbols thereon identical with the symbols of said transmitting station.

References Cited

UNITED STATES PATENTS

| | | | |
|---|---|---|---|
| 2,405,252 | 8/1946 | Goldsmith. | |
| 2,513,402 | 7/1950 | Cooley | 178—5.1 |
| 2,914,603 | 11/1959 | Gabriel | 178—5.1 |
| 3,307,649 | 3/1967 | Ball et al. | |

RODNEY D. BENNETT, JR., Primary Examiner

MALCOLM F. HUBLER, Assistant Examiner